(12) United States Patent
DiBella

(10) Patent No.: US 7,413,682 B2
(45) Date of Patent: Aug. 19, 2008

(54) ANTIOXIDANTS AND METHODS OF MAKING ANTIOXIDANTS

(75) Inventor: Eugene P. DiBella, Newton, NJ (US)

(73) Assignee: Anderol, Inc., East Hanover, NJ (US)

( * ) Notice: Subject to any disclaimer, the term of this patent is extended or adjusted under 35 U.S.C. 154(b) by 87 days.

(21) Appl. No.: 11/464,668

(22) Filed: Aug. 15, 2006

(65) Prior Publication Data

US 2008/0045425 A1    Feb. 21, 2008

(51) Int. Cl.
| C07C 211/26 | (2006.01) |
| C07C 211/30 | (2006.01) |
| C23F 11/14  | (2006.01) |
| C23F 11/173 | (2006.01) |

(52) U.S. Cl. .......................... 252/389.53; 252/400.53; 564/307; 564/308; 564/429; 564/433; 564/434; 564/435; 508/543; 508/563

(58) Field of Classification Search ................ 564/307, 564/308
See application file for complete search history.

(56) References Cited

U.S. PATENT DOCUMENTS

| 3,114,743 | A | * | 12/1963 | Horne, Jr. ................... 526/159 |
| 3,414,618 | A | * | 12/1968 | Randell ....................... 564/429 |
| 3,492,233 | A | * | 1/1970 | Hepplewhite et al. ....... 508/454 |
| 3,509,214 | A | | 4/1970 | Braid et al. |
| 3,573,206 | A | * | 3/1971 | Braid et al. ................. 508/495 |
| 3,634,238 | A | | 1/1972 | Bridger |
| 3,773,665 | A | | 11/1973 | Braid |
| 3,781,361 | A | * | 12/1973 | Wheeler ..................... 564/315 |
| 3,790,478 | A | * | 2/1974 | Rudston et al. ............. 508/298 |
| 4,110,234 | A | | 8/1978 | Loveless et al. |
| 4,600,023 | A | | 7/1986 | Hass et al. |
| 5,160,647 | A | | 11/1992 | Odorisio et al. |
| 5,244,953 | A | | 9/1993 | Odorisio et al. |
| 5,288,803 | A | * | 2/1994 | Yukawa et al. .............. 525/124 |
| 5,489,711 | A | | 2/1996 | Lai |
| 5,880,073 | A | * | 3/1999 | Tomizawa et al. .......... 508/383 |
| 6,194,360 | B1 | * | 2/2001 | Karis et al. ................. 508/438 |
| 6,426,324 | B1 | | 7/2002 | Lai et al. |
| 7,307,049 | B1 | * | 12/2007 | DiBella ....................... 508/459 |
| 2006/0094607 | A1 | * | 5/2006 | Devlin et al. ................ 508/563 |
| 2006/0128574 | A1 | * | 6/2006 | Dong et al. ................. 508/557 |
| 2007/0184989 | A1 | * | 8/2007 | Carr et al. ................... 508/155 |

FOREIGN PATENT DOCUMENTS

| EP | 734432 | 9/1997 |
| WO | WO-95/16765 | 6/1995 |

OTHER PUBLICATIONS

"PCT/US07/75696 International Search Report", 2 pp.

* cited by examiner

Primary Examiner—Joseph D. Anthony
(74) Attorney, Agent, or Firm—Jaimes Sher

(57) ABSTRACT

Antioxidants for industrial, automotive, and aviation lubricants and methods of making the same are provided. A process using alkylated diphenylamines; alkylated phenyl-α-naphthyl amines; and a metal catalyst to form oxidates is provided. The metal catalyst is a combination of a cation and an organic anion, for example, a metal acetylacetone. The reaction takes place in the presence of oxygen to form an antioxidant comprising oligomers of the alkylated diphenylamine and the alkylated phenyl-α-naphthyl amine, and a metal component of the catalyst.

20 Claims, No Drawings

ANTIOXIDANTS AND METHODS OF MAKING ANTIOXIDANTS

FIELD

Antioxidants and methods of making the same are provided. Specifically, methods for making antioxidants for use with industrial, automotive, and aviation lubricants, both mineral and synthetic, are provided.

BACKGROUND

Antioxidants formed from polymerizing alkylated diphenylamines and alkylated phenyl-α-naphthyl amines are widely used in many industrial, automotive, and aviation lubricants, greases, and fluids to improve their oxidative stability. The polymerization reaction is based on oxidizing alkylated diphenylamines and alkylated phenyl-α-naphthyl amines to form a mixture of homo- and cross-oligomers of these compounds. In some prior art processes, the polymerization occurs in the presence of air or oxygen at high temperature (e.g., 150° C. to 300° C. (for example, U.S. Pat. No. 3,509,214).

In other processes, chemical oxidizing agents such as organic peroxides, potassium permanganate, and the like can be used to promote the oxidizing reaction (for example, U.S. Pat. Nos. 3,509,214 and 6,426,324). There are certain safety issues, however, associated with storing and handling organic peroxides.

There is a continuing need, therefore, to provide improved processes and antioxidants.

SUMMARY

Antioxidants for industrial, automotive, and aviation lubricants and methods of making the same are provided. In one aspect of the present invention, there is provided a process comprising: providing an alkylated diphenylamine (ALK DPA), an alkylated phenyl-α-naphthyl amine (ALK PANA), and a catalyst that comprises a cation and an organic anion; mixing the ALK DPA, ALK PANA, and catalyst to form a reaction mixture; and flowing an oxygen-containing gas through the reaction mixture to form an antioxidant. The antioxidant comprises oligomers of the alkylated diphenylamine and the alkylated phenyl-α-naphthyl amine, and the cation.

In another aspect of the present invention, an antioxidant composition is provided, where the antioxidant is produced from a process of providing an alkylated diphenylamine (ALK DPA), an alkylated phenyl-α-naphthyl amine (ALK PANA), and a metal acetylacetoneate; mixing these ingredients to form a reaction mixture; and flowing an oxygen-containing gas through the reaction mixture; wherein the antioxidant composition comprises oligomers of the alkylated diphenylamine and the alkylated phenyl-α-naphthyl amine, and a metal component of the metal acetylacetoneate.

A further aspect of the present invention includes a method comprising providing an antioxidant comprising oligomers of an alkylated diphenylamine and an alkylated phenyl-α-naphthyl amine, and a metal component of the metal acetylacetoneate.

DETAILED DESCRIPTION

Antioxidants for industrial, automotive, and aviation lubricants and methods of making the same are provided. The methods involve the use of an oxygen-containing gas and a metal catalyst to oligomerize alkylated diphenylamine (ALK DPA) and alkylated phenyl-α-naphthyl amine. In this way, safety issues associated with using organic peroxides are avoided.

In one aspect of the present invention, there is provided a process comprising: providing an alkylated diphenylamine, an alkylated phenyl-α-naphthyl amine, and a catalyst that comprises a cation and an organic anion; mixing the ALK DPA, ALK PANA, and catalyst to form a reaction mixture; and flowing an oxygen-containing gas through the reaction mixture to form an antioxidant. The antioxidant comprises oligomers of the alkylated diphenylamine and the alkylated phenyl-α-naphthyl amine, and the cation.

With respect to flowing an oxygen-containing gas through the reaction mixture, it is understood that there is no limit to the sources of oxygen used. For example, the reaction can occur at open exposure to air and/or with an air sparge. In some instances, it may be desirable to use a dried air and/or oxygen supply.

Reference to "a cation and an organic anion" includes the combination of any hydrocarbon anion and a cation that can be joined with the hydrocarbon anion to form a compound. In one embodiment, the catalyst is a metal acetylacetone. In another embodiment, the catalyst is a metal salt of a fatty acid or of an aromatic acid. In some embodiments, the cation is vanadium (V), iron (Fe), nickel (Ni), chromium (Cr), cobalt (including but not limited to Co (III) and Co (II)), manganese (including but not limited to Mn (II)), or combinations thereof. A metal component of the metal acetylacetone includes, but is not limited to, cationic forms of: vanadium (V), iron (Fe), nickel (Ni), chromium (Cr), cobalt (including but not limited to Co (III) and Co (II)), manganese (including but not limited to Mn (II)), or combinations thereof. In certain embodiments, it may be desirable to use catalysts are substantially oil-soluble, that is, the catalysts are soluble enough in a base lubricant to promote the polymerization reaction in solution.

In one embodiment, the reaction occurs at a temperature of less than or equal to approximately 200° C. In another embodiment, the reaction occurs at a temperature of less than or equal to approximately 155° C.

In one embodiment, the process further comprises providing a base lubricant and mixing the reaction mixture with the base lubricant. A base lubricant is meant to include, but is not limited to, hydrocarbon mixtures, both mineral and synthetic, that are suitable for use as lubricants, particularly for industrial, automotive, and aviation lubricants. For instance, the base lubricant may be ester-based. In some instances, it may be desirable to use a base lubricant that is primarily one desired type of ester, e.g., a pentaerythritol (PE)-based ester or a trimethylolpropane (TMP)-based ester. In other embodiments may be desirable to use an ester or mixture of esters derived from a fatty acid chosen from, for example, $C_5$ to $C_{10}$ fatty acids.

In a further embodiment, the process further comprises blending the antioxidant, an additive or an additive package, and an ester to form a lubricant formulation. By reference to lubricant formulation, it is meant a final formulation that is packaged into cans, drums, railcars, or the like for an end-user. Additives used in lubricant formulations include, but are not limited to anti-wear agents, corrosion inhibitors, rust inhibitors, metal passivators, and other antioxidants.

In another embodiment, a molar ratio of the metal component or the cation to nitrogen in the reaction mixture is less than or equal to approximately 0.05:1. In yet another embodiment, the molar ratio is less than or equal to approximately 0.025:1.

Another way to use the methods of the present application is to treat the antioxidant product to reduce an amount of the metal component or cation. In certain embodiments, the antioxidant can be treated with activated carbon and/or an acid, for example, a dicarboxylic acid. In some instances, it may be desirable to reduce the amount of the metal component to less than 1 ppm. In some methods, the antioxidant is filtered to remove insoluble metal-containing species.

The process may be carried out under various conditions. In one embodiment, a molar ratio of alkylated diphenylamine to alkylated phenyl-α-naphthyl amine can be from approximately 1:1 to approximately 5:1 before the reaction. In some embodiments, it may be desirable that this molar ratio is approximately 3:1.

In another aspect of the present invention, an antioxidant composition is provided, where the antioxidant is produced from a process of providing an alkylated diphenylamine; providing an alkylated phenyl-α-naphthyl amine; providing a metal acetylacetoneate; and mixing the alkylated diphenylamine, the alkylated phenyl-α-naphthyl amine, and the metal acetylacetoneate to form a reaction mixture; and flowing an oxygen-containing gas through the reaction mixture; wherein the antioxidant composition comprises oligomers of the alkylated diphenylamine and the alkylated phenyl-α-naphthyl amine, and a metal component of the metal acetylacetoneate.

In one embodiment, an amount of the residual cation or metal component is less than approximately 100 ppm. In another embodiment, this amount is less than approximately 10 ppm. By reference to residual, it is meant the amount of cation or metal component leftover in the antioxidant product after the reaction or post-treated reaction and before blending the antioxidant into a base oil. Should the antioxidant be treated and/or filtered, in some embodiments the residual cation or metal component is less than 1 ppm.

Before describing several exemplary embodiments of the invention, it is to be understood that the invention is not limited to the details of construction or process steps set forth in the following description. The invention is capable of other embodiments and of being practiced or being carried out in various ways.

EXAMPLES

Example 1

An alkylated diphenylamine/alkylated phenyl-α-naphthylamine-based antioxidant (also referred to as ALK DPA/ALK PANA oxidate) via transition metal-catalyzed oxidative oligomerization using atmospheric oxygen was prepared under conditions described in Table 1. The transition metal catalysts used were metal acetylacetonates (AcAc). The metal AcAc catalysts were each charged at the ratio of ~0.0245 mole of metal component to mole nitrogen in the ALK DPA/ALK PANA mixture. Commercially available ALK DPA is known as Vanlube-81, and commercially available ALK PANA is known as Irganox LO-6. Reactions were carried out on a 0.12 mole nitrogen scale with a chosen molar mix of ALK DPA/ALK PANA with agitation at a temperature ranging from ~143° C. to ~149° C. with open exposure to air as the oxidizing reactant. Some runs included a base oil medium at 50% by weight.

The resulting oxidate products were not filtered. Table 1 provides, for certain runs, the amount of residual metal in the oxidate. Mn is number average molecular weight and Mw is weight average molecular weight. GPC test results of the resulting oxidate products generally corresponded to known materials.

TABLE 1

| Run | Metal of AcAc Catalyst | Temp. °C. | Time (hours) | ALK DPA/ ALK PANA Mole Ratio | Base Oil Medium Used? | Oxidate Product Properties |
|---|---|---|---|---|---|---|
| a | None | 143-147 | 24 | 3/1 | No | Mn 501 Mw 591 |
| b | V | 145-146 | 24 | 3/1 | No | 50 ppm V Mn 601 Mw 896 |
| c | Fe | 145-146 | 24 | 3/1 | No | 27 ppm Fe Mn 740 Mw 896 |
| d | Ni | 145-146 | 24 | 3/1 | No | Mn 501 Mw 583 |
| e | Cr | 144-146 | 24 | 3/1 | No | Mn 414 Mw 487 |
| f | Mn | 147-148 | 24 | 3/1 | Yes | 89 ppm Mn |
| g | Co III | 144-145 | 24 | 3/1 | Yes | 114 ppm Co |
| h | Co III | 145-147 | 24 | 3/1 | No | 373 ppm Co Mn 558 Mw 656 |
| i | Co III | 146-149 | 96 | 3/1 | No | 438 ppm Co Mn 659 Mw 748 |
| j | Co III | 146-149 | 24 | 1/1 | No | 438 ppm Co Mn 489 Mw 600 |

A further aspect of the present invention includes a method comprising providing an antioxidant comprising oligomers of an alkylated diphenylamine and an alkylated phenyl-α-naphthyl amine, and a metal component of the metal acetylacetoneate.

Example 2

ALK DPA/ALK PANA oxidates were also prepared under conditions as described in Table 2. The acetylacetonates (AcAc) were each charged at a chosen ratio of metal component to mole nitrogen in the ALK DPA/ALK PANA mixture. Neat reactions were carried out on a 1.26 mole nitrogen scale. Some runs included a base oil medium at 50% by weight and were carried out on a 0.61 mole nitrogen basis. For these runs, a 3/1 molar mix of ALK DPA/ALK PANA with agitation at a temperature ranging from ~145° C. to ~155° C. Dry air, using a Drierite column, was sparged into the reaction mixtures at the rates shown in Table 2. Mn is number average molecular weight and Mw is weight average molecular weight. For examples where a base ester medium was used, methanol-insoluble components were analyzed and the results reported under "oxidate product properties." The methanol-insoluble components were deemed to be representative of the higher molecular weight materials produced via the oxidative/oligomerization treatment.

TABLE 2

| Run | Metal of AcAc Catalyst (mole %) | Temp. ° C. | Time (hours) | Air Flow L/hr | Base Ester Medium Used? | Oxidate Product Properties |
|---|---|---|---|---|---|---|
| k | Co III (2.52) | 145-155 | 47 | 11-18 | No | Hard brittle solid; Mn 718 Mw 832 |
| l | Co III (2.52) | 150 | 73 | 19 | Yes | Viscous Oil Mn 899 Mw 1016 |
| m | Mn II (2.44) | 150 | 72 | 19 | Yes | Viscous Oil Mn 926 Mw 993 |
| n | None | 150 | 74 | 19 | No | Hard brittle semisolid |

TABLE 2-continued

| Run | Metal of AcAc Catalyst (mole %) | Temp. ° C. | Time (hours) | Air Flow L/hr | Base Ester Medium Used? | Oxidate Product Properties |
|---|---|---|---|---|---|---|
| o | None | 150 | 72 | 19 | Yes | Mn 651 Mw 775 Viscous Oil Mn 897 Mw 965 |

Example 3

Some of the ALK DPA/ALK PANA oxidates of Examples 1 and 2 were used to make a lubricant formulation having a composition of 95.29 weight % ester, 2.35 weight % other additives, and 2.35 weight % oxidate. Oxidation Corrosion (OCS) testing was carried out using Federal Test Method 5308 under conditions of 400° C., 72 hours, 5 liters/hour air flow using test metals of copper, aluminum, steel, silver, and zinc. Table 3 summarizes the appearance results, using visual descriptions and corrosion chart letter/number designations in accordance with the standard test. For example, "Sl" means slight and "V" means very. For the Copper analysis, the ASTM D-130 Copper Strip Corrosion standards were used. Generally, a "3" indicates the most tarnish, a "2" indicates less tarnish than a "3" and more than a "1", and "1" indicates the least; gradations of A, B, and/or C within the numbers are also provided to account for color changes and other appearance differences.

TABLE 3

| Run | Metal of AcAc Catalyst | Apperance of Oil | Apperance of Copper metal | Appearance of Aluminium metal | Appearance of Steel metal | Appearance of Silver metal | Appearance of Zinc metal |
|---|---|---|---|---|---|---|---|
| a | None | Dark Amber | 3A | V Sl Tarnish | Brown-Blue Tarnish | Mod Tarnish | Sl Tarnish |
| b | V | Dark Brown | 2 C Mod Tarnish | Unchanged | Blue Tarnish | Sl Tarnish | Sl Tarnish |
| c | Fe | Dark Brown | 2 C Mod Tarnish | Sl Tarnish | Blue Tarnish | Sl Tarnish | Sl Tarnish |
| g | Co III | Dark Brown | 2 C Mod Tarnish | Sl Tarnish | Blue Tarnish | Sl Tarnish | Sl Tarnish |
| h | Co III | Dark Amber | 3A | V Sl Tarnish | Dark Brown-Blue Tarnish | Sl Tarnish | Sl Tarnish |
| i | Co III | Dark Amber | 3A | V V Sl Tarnish | V Sl Tarnish | V Sl Tarnish | Dark Brown-Blue Tarnish |
| j | Co III | Dark Amber | 3A | V V V Sl Tarnish | Dark Brown-Blue Tarnish | V V Sl Tarnish | V Sl Tarnish |
| k | Co III | Dark Brown | 2C | V Sl Tarnish | Dark Brown-SL Dark Blue Tarnish | V Sl Tarnish | V Sl Tarnish |
| l | Co III | Dark Amber | 1B/2A | V Sl Tarnish | Dark Brown-Blue Tarnish | V Sl Tarnish | V Sl Tarnish |
| m | Mn II | Dark Amber | 2C/2B | V Sl Tarnish | V Dark Blue | Sl Tarnish | Sl Tarnish |
| o | None | Dark Amber | 1B/2A | V Sl Tarnish | Dark Blue with Dark Tarnish | Sl Tarnish | V Sl Tarnish |

Table 4 summarizes the properties of the oil after the test cycle.

TABLE 4

| Run | Metal of AcAc Catalyst | 40° C. Viscosity, % change | Total Acid Number (TAN) Change | Evap, % Loss | Sludge, mg |
|---|---|---|---|---|---|
| a | None | 20.45 | 1.88 | 3.16 | 17.0 |
| b | V | 15.18 | 0.85 | 2.22 | 24.1 |
| c | Fe | 18.17 | 0.36 | 4.00 | 4.8 |
| g | Co III | 3.37 | −0.26 | 0.19 | 7.5 |
| h | Co III | 18.51 | 1.54 | 2.95 | 2.4 |
| i | Co III | 21.23 | 1.9 | 2.92 | 2.6 |
| j | Co III | 13.87 | 1.14 | 2.05 | 9.6 |
| k | Co III | 18.71 | 1.06 | 3.29 | 2.5 |
| l | Co III | 12.70 | 0.23 | 2.31 | 3.5 |
| m | Mn II | 6.82 | −0.39 | 1.97 | 2.0 |
| o | None | 21.12 | 0.6 | 3.74 | 1.9 |

Table 5 summarizes the corrosion, weight loss (gain) of the metals after the test cycle.

TABLE 5

| | Metal of AcAc | Corrosion: Weight Loss (Gain), mg/cm$^2$ | | | | |
|---|---|---|---|---|---|---|
| Run | Catalyst | Copper | Aluminum | Steel | Silver | Zinc |
| a | None | 0.054 | (0.016) | (0.023) | 0.039 | 0.046 |
| b | V | 0.046 | (0.008) | (0.039) | (0.008) | (0.008) |
| c | Fe | 0.078 | 0 | (0.002) | (0.003) | (0.002) |
| g | Co III | (0.023) | 0 | 0 | (0.008) | (0.008) |
| h | Co III | 0.108 | 0 | (0.008) | 0.016 | 0 |
| i | Co III | 0.163 | 0.016 | 0.039 | 0.023 | 0.008 |
| j | Co III | 0.116 | (0.008) | (0.039) | 0 | 0.008 |
| k | Co III | 0.124 | (0.008) | (0.008) | (0.008) | 0.0 |
| l | Co III | 0.070 | (0.008) | (0.039) | 0.039 | (0.008) |
| m | Mn II | 0.101 | (0.008) | (0.023) | 0.016 | 0.031 |
| o | None | 0.155 | (0.023) | (0.031) | 0.008 | 0.008 |

Example 4

Solubility and DSC (differential scanning calorimetry) studies were performed to analyze the effect of the metal component of the catalyst on oxidative induction. Table 6 shows the solubilities of the metal components at room temperature (~20° C.) in an exemplary ester and additives blend that is a base oil for lubricants. To determine the effect of the metal components at the maximum concentration levels shown in Table 6, DSC screenings (60° C./min in air to 500° C.) were carried out.

TABLE 6

| | Solubility | | Oxidative Induction Temp. ° C. | | |
|---|---|---|---|---|---|
| Metal Component | ppm | Mole % × 10$^3$ | Neat Blend | Blend + Metal | Increment, ° C. |
| V | 3998 | 7.85 | 236.51 | 259.98 | +23.47 |
| Cr | 177 | 0.340 | 239.06 | 224.13 | −14.93 |
| Mn | 1495 | 2.72 | 236.51 | 289.03 | +52.52 |
| Fe | 1560 | 2.79 | 236.51 | 231.38 | −5.13 |
| Co | 906 | 1.54 | 235.98 | 305.29 | +69.31 |
| Ni | 901 | 1.54 | 236.51 | 282.14 | +45.63 |
| Cu | 233 | 0.367 | 236.51 | 189.41 | −47.11 |

The antioxidant effects of the metals shown in Table 6 at their maximum concentration levels cause the oxidative induction temperature to vary significantly. The highest positive effects came with Mn and Co. This is surprising because these inorganic-free radical catalysts would be expected to promote oxidation at any temperature, not anti-oxidant activity.

Additional studies related to the effect of metal on oxidative induction temperature were performed at a level approximating the maximum amount of each metal in a final formulation. That is, 1.36×10$^{-4}$ mole percent (e.g., 69-86 ppm range from V to Cu) based on using 0.0245 mole % of metal component in the metal acetylacetonates catalyst charged to make the oxidates. Table 7 shows the DSC screening results.

TABLE 7

| | Oxidative Induction Temp. ° C. | | |
|---|---|---|---|
| Metal Component | Neat Ester Blend | Ester Blend + Metal | Increment, ° C. |
| V | 242.65 | 232.38 | −10.37 |
| Cr | 242.65 | 207.27 | −35.38 |
| Mn | 242.65 | 231.79 | −10.86 |
| Fe | 242.65 | 223.76 | −18.89 |
| Co | 242.65 | 229.23 | −13.42 |
| Ni | 242.65 | 236.14 | −6.51 |
| Cu | 242.65 | 200.95 | −41.70 |

With the exception of Cu, the changes from the higher levels of metal were in a negative direction. Accordingly, a higher level of metal acetylacetonates appears necessary to provide improved antioxidant activity.

Example 5

The use of antioxidants in various lubricants, however, typically warrants the removal of any metal component. Removal of metals, therefore, was performed. A base oil was mixed with an oxidate made with a Co III acetylacetonate catalyst and treated under a variety of conditions.

In one treatment, Darco G-60 Activated Carbon was charged into the base oil/oxidate mixture at 0.99 weight % for 10 minutes at 130-135° C. This resulted in reducing the Co content to 1 ppm. Without being bound by theory, it appears that the use of carbon results in straight absorption of the Co, and generally no side reactions with formation of by-products are involved. Also, no peptization of carbon was evident.

In another, independent treatment, sebacic acid was charged into the base oil/oxidate mixture at 0.56 weight % for 1 hour at 135-140° C. resulted in reducing the Co content to 1 ppm. The final acid number was 0.36 compared to 0.09 for the base oil. This implies that a neutralization step is also needed after the use of sebacic acid. Alternatively, a reduced amount of sebacic acid could be used in accordance with the actual amount of metals that needs to be removed.

Example 6

In another example to demonstrate removal of metal catalyst, a base oil was spiked with 170 ppm Mn II acetylacetonate catalyst and treated under a variety of conditions.

In one treatment, Darco G-60 Activated Carbon was charged into the base oil/Mn (II) catalyst mixture at 1.0 weight % for 10 minutes at 130-135° C. resulted in reducing the Mn (II) content to <1 ppm.

In another, independent treatment, sebacic acid was charged into the base oil/Mn (II) catalyst mixture at 0.71 weight % for 1 hour at 135-140° C. resulted in reducing the Mn (II) content to <1 ppm. The final acid number was 0.45 compared to 0.09 for the base oil.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A process comprising:
    providing an alkylated diphenylamine;
    providing an alkylated phenyl-α-naphthyl amine;
    providing a catalyst that comprises a cation and an organic anion;
    mixing the alkylated diphenylamine, the alkylated phenyl-α-naphthyl amine, and the catalyst to form a reaction mixture; and
    flowing an oxygen-containing gas through the reaction mixture to form an antioxidant comprising oligomers of the alkylated diphenylamine and the alkylated phenyl-α-naphthyl amine, and the cation.

2. The process of claim 1, wherein the catalyst is substantially oil-soluble.

3. The process of claim 1, wherein the catalyst comprises a metal acetylacetoneate.

4. The process of claim 3, wherein the metal acetylacetoneate is substantially oil-soluble.

5. The process of claim 1, wherein the reaction occurs at a temperature of less than or equal to approximately 200° C.

6. The process of claim 1, wherein the reaction occurs at a temperature of less than or equal to approximately 155° C.

7. The process of claim 1, further comprising providing a base lubricant and mixing the reaction mixture with the base lubricant.

8. The process of claim 1, further comprising blending the antioxidant, an additive package, and an ester to form a lubricant formulation.

9. The process of claim 1, wherein a molar ratio of the cation to nitrogen in the reaction mixture is less than or equal to approximately 0.05:1.

10. The process of claim 9, wherein the molar ratio is less than or equal to approximately 0.025:1.

11. The process of claim 1, wherein the cation comprises Co (III), Co (II), Mn (II), or combinations thereof.

12. The process of claim 3, wherein a metal of the metal acetylacetoneate comprises Co (III), Co (II), Mn (II), or combinations thereof.

13. The process of claim 1, further comprising treating the antioxidant to reduce an amount of the cation.

14. The process of claim 1, further comprising filtering the antioxidant.

15. The process of claim 13, wherein the amount of the cation is less than or equal to approximately 1 ppm.

16. The process of claim 1, wherein a molar ratio of alkylated diphenylamine to alkylated phenyl-α-naphthyl amine is from approximately 1:1 to approximately 5:1 before the reaction.

17. The process of claim 16, wherein the molar ratio is approximately 3:1.

18. An antioxidant composition produced from a process of
    providing an alkylated diphenylamine;
    providing an alkylated phenyl-α-naphthyl amine;
    providing a metal acetylacetoneate;
    mixing the alkylated diphenylamine, the alkylated phenyl-α-naphthyl amine, and the metal acetylacetoneate to form a reaction mixture; and
    flowing an oxygen-containing gas through the reaction mixture;
    wherein the antioxidant composition comprises oligomers of the alkylated diphenylamine and the alkylated phenyl-α-naphthyl amine, and a metal component of the metal acetylacetoneate.

19. The composition of claim 18, wherein an amount of the metal component is less than approximately 100 ppm.

20. A method of providing an antioxidant for industrial, automotive and aviation lubricants comprising providing to said lubricants an antioxidant comprising oligomers of an alkylated diphenylamine and an alkylated phenyl-α-naphthyl amine, and a metal component of a metal acetylacetoneate.

* * * * *